United States Patent
Schwartz et al.

(10) Patent No.: US 9,760,758 B2
(45) Date of Patent: Sep. 12, 2017

(54) DETERMINING WHICH HAND IS BEING USED TO OPERATE A DEVICE USING A FINGERPRINT SENSOR

(71) Applicant: Synaptics Incorporated, San Jose, CA (US)

(72) Inventors: Adam L Schwartz, San Jose, CA (US); Bob Lee Mackey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/984,918

(22) Filed: Dec. 30, 2015

(65) Prior Publication Data

US 2017/0193261 A1  Jul. 6, 2017

(51) Int. Cl.
*G06K 9/00* (2006.01)
*G06F 3/041* (2006.01)

(52) U.S. Cl.
CPC ........... *G06K 9/001* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 8,698,761 B2* | 4/2014 | Arastafar | 345/156 |
| 9,536,130 B2* | 1/2017 | Pierce | G06K 9/00067 |
| 2007/0236460 A1 | 10/2007 | Young et al. | |
| 2010/0310136 A1 | 12/2010 | Tsuda | |
| 2012/0032891 A1* | 2/2012 | Parivar | G06F 3/04883 345/173 |
| 2012/0056730 A1* | 3/2012 | Ujiie | G06F 3/03547 340/12.22 |
| 2012/0176336 A1* | 7/2012 | Yamada | G06F 1/1626 345/173 |
| 2013/0002578 A1* | 1/2013 | Ito | G06F 3/0488 345/173 |
| 2013/0176214 A1* | 7/2013 | Chao | G06F 3/0416 345/157 |
| 2013/0201155 A1* | 8/2013 | Wu | G06F 3/03547 345/174 |
| 2013/0215060 A1* | 8/2013 | Nakamura | G06F 1/1626 345/173 |
| 2014/0003683 A1* | 1/2014 | Vieta | G06K 9/3208 382/124 |

(Continued)

FOREIGN PATENT DOCUMENTS

WO    WO 2015/174632 A1    11/2015

OTHER PUBLICATIONS

Vandermeijden, Tom, Detecting Handedness through Screen Interaction, publication (2014).

*Primary Examiner* — Soo Park
(74) *Attorney, Agent, or Firm* — Leydig, Voit & Mayer, Ltd.

(57) ABSTRACT

A method for using a fingerprint sensor on a mobile device to determine which hand is being used to operate the mobile device includes: acquiring, by a processor, sensing data from the fingerprint sensor corresponding to a finger sensed by the fingerprint sensor; determining, by the processor, an orientation of the finger based on the acquired sensing data; and generating, by the processor, a signal for indicating which hand is being used to operate the mobile device based on the determined orientation of the finger.

21 Claims, 15 Drawing Sheets

(56) References Cited

U.S. PATENT DOCUMENTS

| | | | |
|---|---|---|---|
| 2014/0055371 A1 | 2/2014 | Li et al. | |
| 2015/0089359 A1* | 3/2015 | Brisebois | G06F 3/04817 715/702 |
| 2015/0324570 A1* | 11/2015 | Lee | G06K 9/3208 382/124 |
| 2016/0055825 A1* | 2/2016 | Lee | G01J 1/0219 345/207 |
| 2016/0179338 A1* | 6/2016 | Miller | G06F 3/04817 345/174 |
| 2016/0283772 A1* | 9/2016 | Nelson | G06F 3/0421 |

* cited by examiner

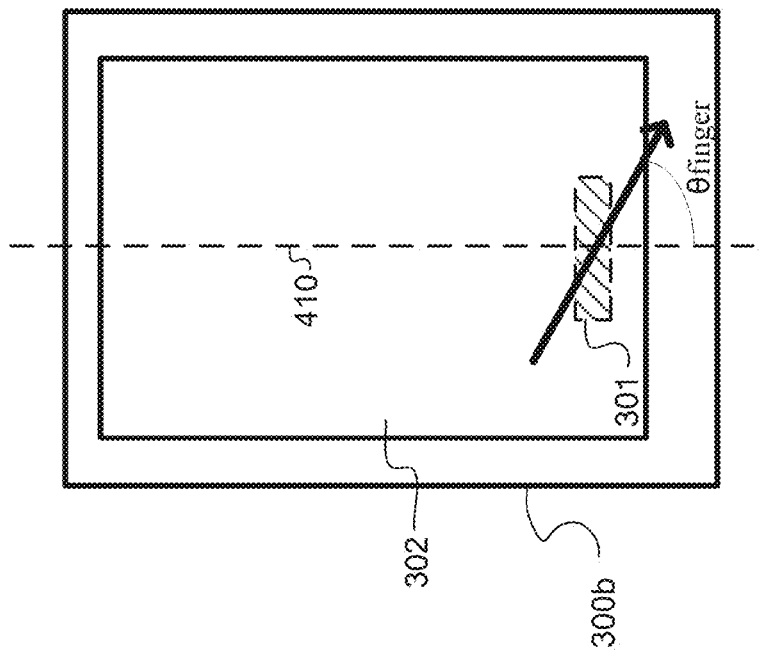
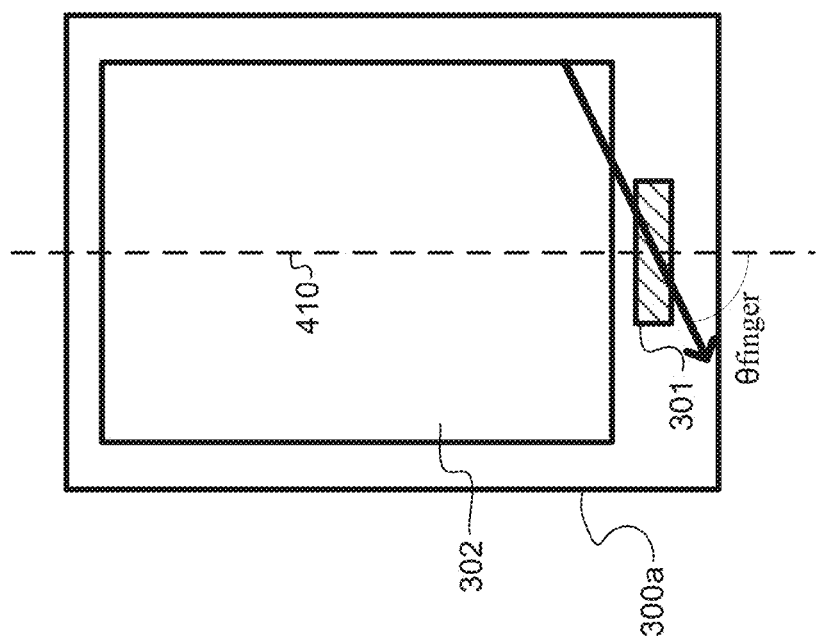

DETERMINING WHICH HAND IS BEING USED TO OPERATE A DEVICE USING A FINGERPRINT SENSOR

BACKGROUND

Input devices including touch sensor devices (also commonly called touchpads or proximity sensor devices), as well as fingerprint sensors, are widely used in a variety of electronic systems.

Touch sensor devices typically include a sensing region, often demarked by a surface, in which the touch sensor device determines the presence, location and/or motion of one or more input objects, typically for purposes allowing a user to provide user input to interact with the electronic system.

Fingerprint sensors also typically include a sensing region in which the fingerprint sensor determines presence, location, motion, and/or features of a fingerprint or partial fingerprint, typically for purposes relating to user authorization or verifying the identity of a user.

Touch sensor devices and fingerprint sensors may thus be used to provide interfaces for the electronic system. For example, touch sensor devices and fingerprint sensors are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

SUMMARY

In an exemplary embodiment, a method for using a fingerprint sensor on a mobile device to determine which hand is being used to operate the mobile device includes: acquiring, by a processor, sensing data from the fingerprint sensor corresponding to a finger sensed by the fingerprint sensor; determining, by the processor, an orientation of the finger based on the acquired sensing data; and generating, by the processor, a signal for indicating which hand is being used to operate the mobile device based on the determined orientation of the finger.

In another exemplary embodiment, a system for using a fingerprint sensor on a mobile device to determine which hand is being used to operate the mobile device includes: a fingerprint sensor, configured to generate sensing data corresponding to a finger sensed by the fingerprint sensor; and a processing system, configured to acquire the sensing data from the fingerprint sensor, determine an orientation of the finger based on the acquired sensing data, and generate a signal for indicating which hand is being used to operate the mobile device based on the determined orientation of the finger.

In another exemplary embodiment, a mobile device includes: a fingerprint sensor, configured to generate sensing data corresponding to a finger sensed by the fingerprint sensor; a touch screen display, configured to display a graphical user interface (GUI); and a processing system, configured to acquire the sensing data from the fingerprint sensor, determine an orientation of the finger based on the acquired sensing data, generate a signal for indicating which hand is being used to operate the mobile device based on the determined orientation of the finger, and modify the GUI based on the generated signal.

BRIEF DESCRIPTION OF THE SEVERAL VIEWS OF THE DRAWINGS

FIGS. 9A-9B illustrate exemplary swiping motions across a fingerprint sensor on exemplary devices.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

Turning to the drawings, and as described in greater detail herein, embodiments of the disclosure provide methods and systems for determining which hand (i.e., a user's right hand or left hand) is being used to operate a device (e.g., determining which hand is holding a handheld mobile device such as a smartphone or tablet) based on a determined orientation of a finger placed on or swiped across a biometric sensor (and/or a touch sensor). A signal can thus be generated that indicates which hand is being used to operate the device, and appropriate modifications to device operation can be made based on the generated signal.

For example, if it is determined that, for a handheld touch screen device such as a smartphone, a user is holding the device with his or her left hand, the graphical user interface (GUI) displayed on the touch screen may be modified to accommodate more convenient usage of the device for the user's left hand (e.g., by moving one or more interactive components of the GUI such as buttons or icons to a location more easily accessible to the thumb of the left hand).

Figure 1:
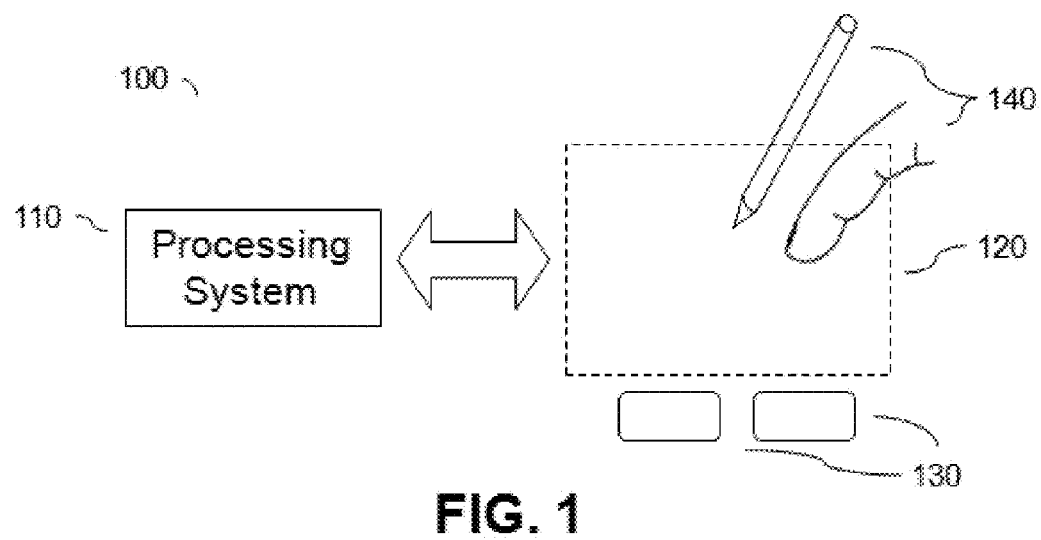
FIG. 1 is a block diagram of an exemplary input device.
Figure 2:
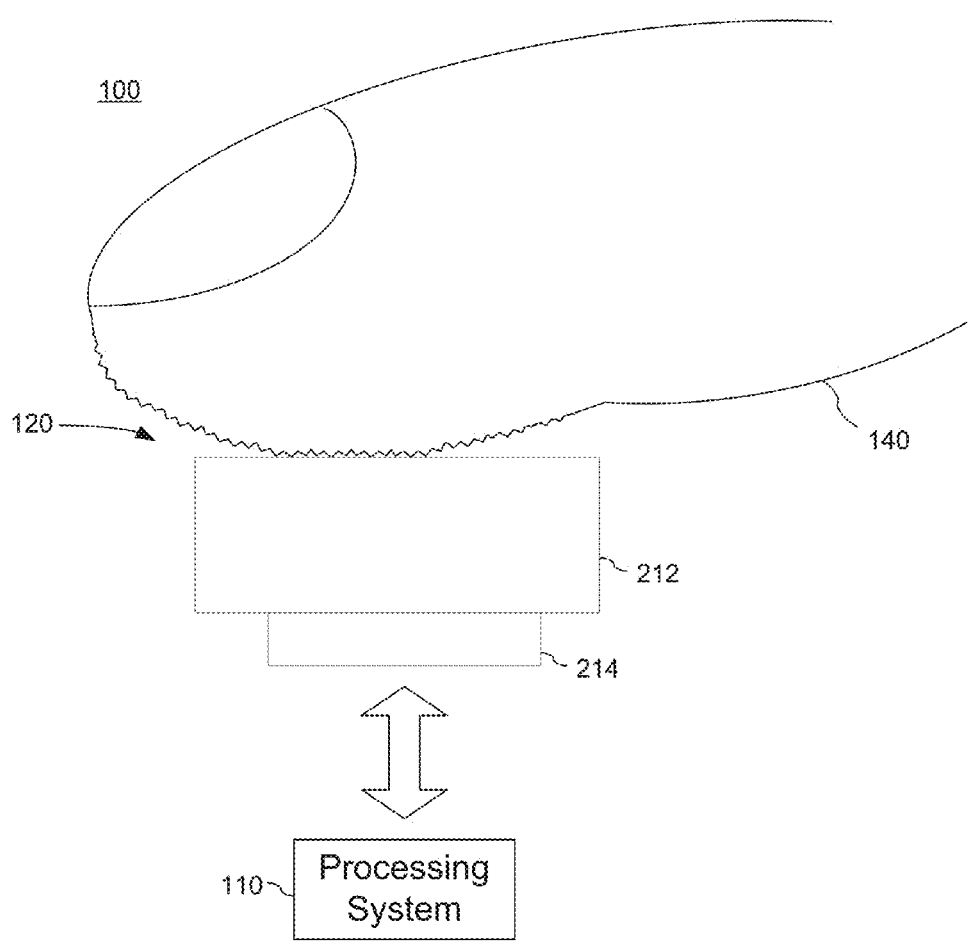
FIG. 2 is a block diagram of another exemplary input device.

FIG. 1 is a block diagram of an exemplary input device 100. FIG. 2 is a block diagram of another exemplary input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a touch sensor device (also often referred to as a "touch sensor"), configured to sense input provided by one or more input objects 140 in a sensing region 120. In FIG. 2, the input device 100 is shown as a biometric sensor device configured to sense a fingerprint provided by a finger 140 in a sensing region 120. Example input objects include a finger and stylus.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. For example, the input device 100 may use capacitive techniques, where voltage or current is applied to create an electric field. Nearby input objects cause changes in the electric field, and produce detectable changes in capacitive coupling that may be detected as changes in voltage, current, or the like.

One exemplary technique utilizes "mutual capacitance" sensing methods based on changes in the capacitive coupling between sensor electrodes. Other exemplary capacitive techniques include "self-capacitance" (or "absolute capacitance") sensing methods based on changes in the capacitive coupling between sensor electrodes and an input object. Other exemplary sensing techniques include, for example, optical sensing techniques, ultrasonic sensing techniques, pressure-based (e.g., piezoelectric) sensing techniques, or thermal sensing techniques.

In FIGS. 1-2, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system 110.

It should be understood that while certain embodiments are described in the context of a fully functioning apparatus, the mechanisms described herein are capable of being distributed as a program product (e.g., software) in a variety of forms. For example, the mechanisms may be implemented and distributed as a software program on information bearing media that are readable by electronic processors (e.g., non-transitory computer-readable and/or recordable/writable information bearing media readable by the processing system 110). Additionally, other types of media may be used to carry out the distribution. Examples of non-transitory, electronically readable media include various discs, memory sticks, memory cards, memory modules, and the like. Electronically readable media may be based on flash, optical, magnetic, holographic, or any other storage technology.

FIG. 2 is a block diagram of another exemplary input device 100 implemented as a fingerprint sensor. The sensor includes a sensor substrate 214 having one or more sensing elements for detecting a fingerprint from the finger 140. The sensor substrate 214 is disposed underneath a cover layer 212 that provides an input surface for the fingerprint to be placed or swiped over the sensing element. The sensor substrate 212 may include a cover glass for a display screen, such as a touch screen. In other embodiments, the sensor may be located on a button, or in a dedicated fingerprint sensing location having a discrete cover layer made of another suitable material. While one implementation of a fingerprint sensor is illustrated in FIG. 2, it should be appreciated that sensors according to the exemplary embodiments described herein may be beneficially utilized in a wide variety of fingerprint sensor designs and implementations, including, for example, optical fingerprint sensor systems and acoustic fingerprint sensor systems.

Figure 3A:
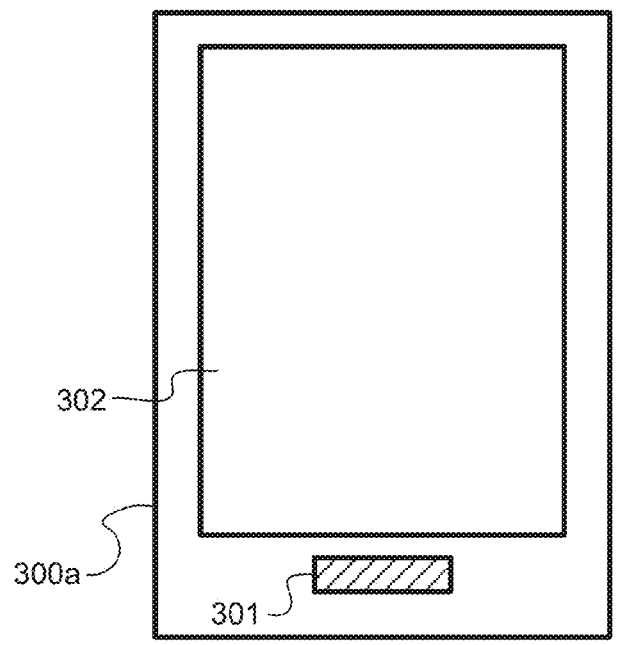
FIGS. 3A-3B are block diagrams illustrating exemplary handheld devices having both a touch screen interface and a fingerprint sensing interface.
Figure 3B:
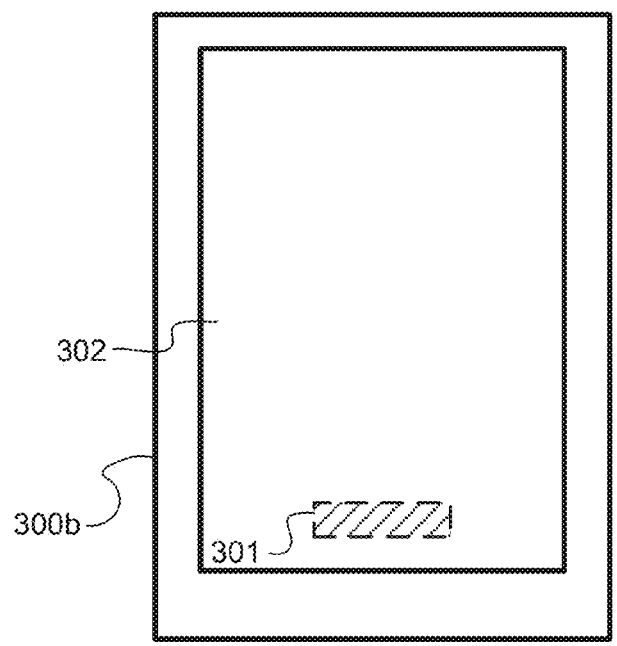

FIGS. 3A-3B are block diagrams illustrating exemplary handheld devices 300a and 300b having both a touch screen interface and a fingerprint sensing interface. In FIG. 3A, the handheld device (e.g., a smartphone or tablet) 300a has a fingerprint sensor 301 that is separate from a touch screen 302, such that the fingerprint sensor and the touch sensor (of the touch screen) have separate interfaces. In FIG. 3B, the handheld device (e.g., a smartphone or tablet) 300b has a fingerprint sensor 301 that is integrated with the touch screen 302, such that the interface for the fingerprint sensor overlaps with the interface for the touch sensor. The handheld devices 300a and 300b illustrated in FIGS. 3A-3B are examples of environments in which embodiments of the present disclosure are applicable to determine which hand is being used to operate a device.

Figure 4A:
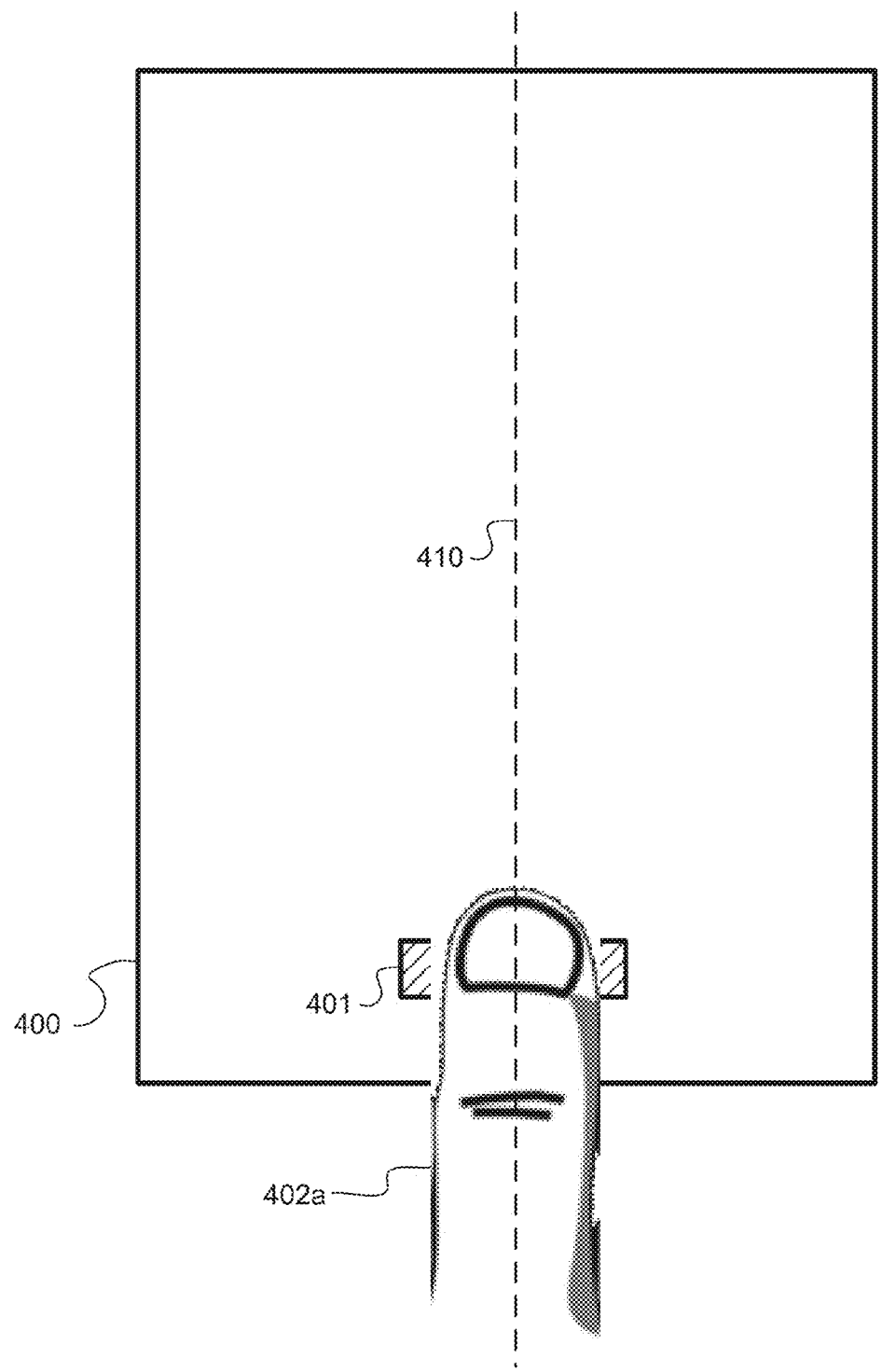
FIGS. 4A-4C illustrate different exemplary use cases for a handheld device having a fingerprint sensor.
Figure 4B:
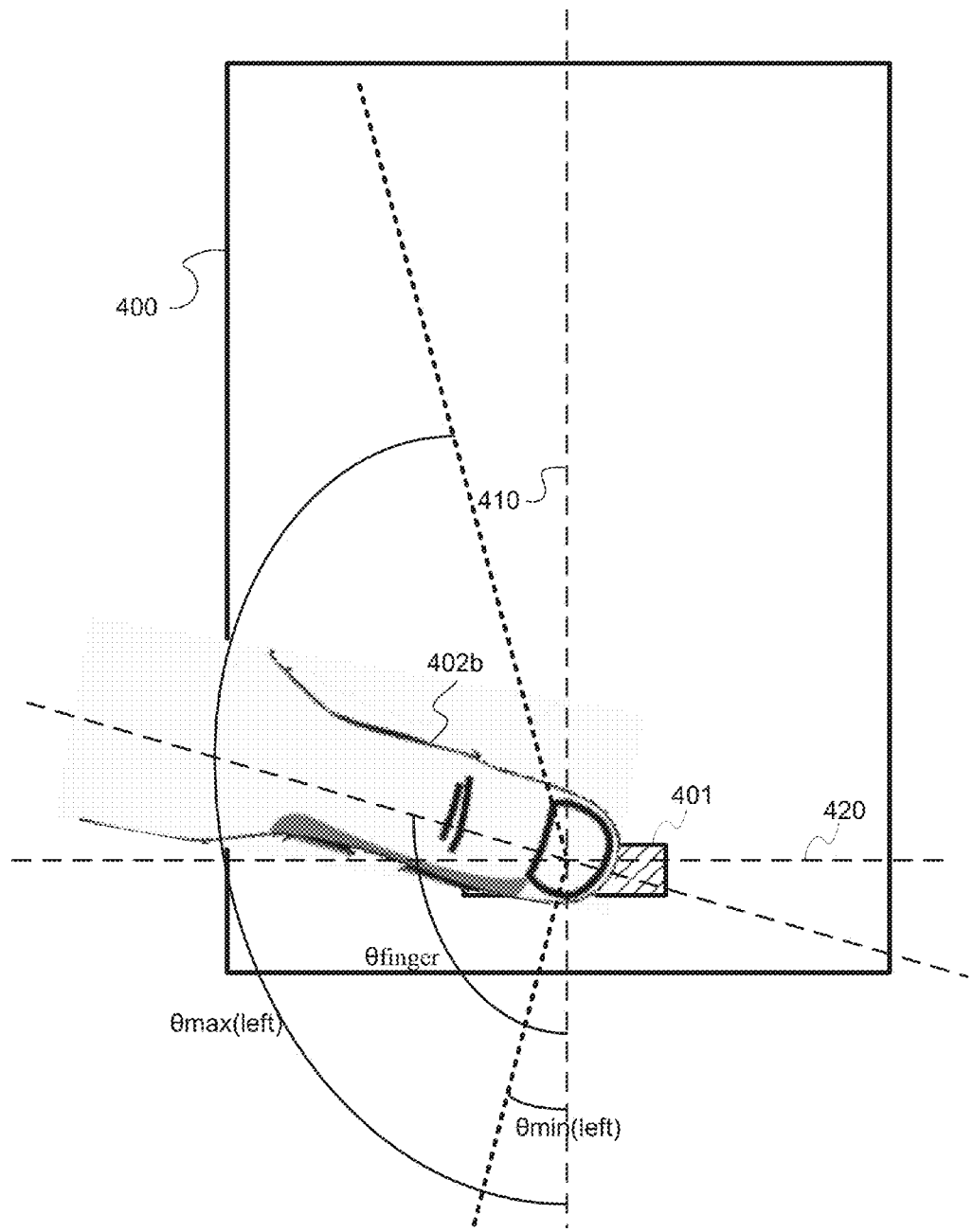
Figure 4C:
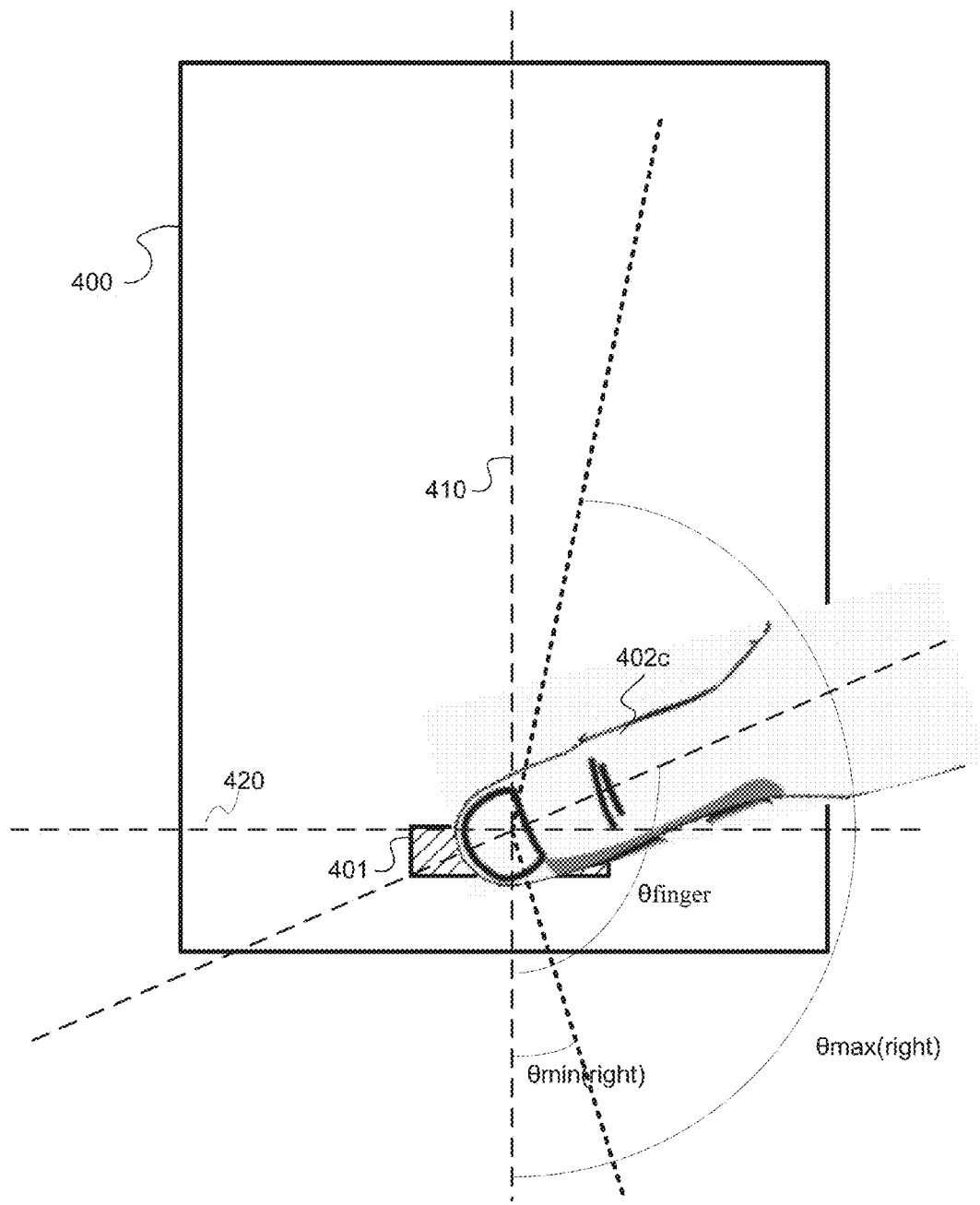

FIGS. 4A-4C illustrate different exemplary use cases for a handheld device 400 having a fingerprint sensor 401.

FIG. 4A illustrates an exemplary enrollment operation, where a user is registering the thumb of either the user's right hand or left hand 402a with a fingerprint sensor 401 of the handheld device 400. Users often perform the enrollment operation in a vertical manner (for example, as part of a guided enrollment process where the user is instructed to perform the enrollment operation in a vertical manner, as well as in unguided enrollment processes) as illustrated in FIG. 4A, with the user's thumb 402a being aligned to a vertical axis 410 of the fingerprint sensor 401 during the enrollment operation (e.g., at an angle of 0° or close to 0° relative to vertical).

FIG. 4B illustrates an exemplary authorization operation performed by the fingerprint sensor 401 with respect to the user's left thumb 402b while the handheld device 400 is held by the user's left hand. As can be seen in FIG. 4B, when the user operates the device 400 with one hand (e.g., the user holds the device 400 with his or her left hand and uses his or her left thumb to provide input to the fingerprint sensor 401), the finger will generally have a non-zero angle (denoted θfinger in FIG. 4B) relative to the vertical axis 410.

When the angle (θfinger) corresponding to the orientation of the finger is within a range of angles (i.e., between θmin(left) and θmax(left)) associated with operation of the device 400 using the user's left hand, the processing system of the device 400 generates a signal indicating that the device 400 is being operated using a left hand. In the example depicted in FIG. 4B, it can be seen that θmin(left) is about 30 degrees to the left of the vertical axis 410 (−30°) and θmax(left) is about 150 degrees to the left of the vertical axis 410 (−150°), and that the range of angles includes the situation where the left thumb is horizontally placed on the fingerprint sensor from the left side of the mobile device (i.e., where the thumb is placed along horizontal axis 420 on the left side of the device, or, in other words, at 90 degrees to the left of the vertical axis (−90°)).

It will be appreciated that, in other exemplary embodiments, other ranges of angles for θfinger may be associated with operation of the device 400 using the user's left hand. It is preferred that such ranges would include the θfinger of 90 degrees to the left of vertical (−90°), corresponding to a left thumb being placed horizontally on the fingerprint sensor from the left side of the mobile device.

FIG. 4C illustrates an exemplary authorization operation performed by the fingerprint sensor 401 with respect to the user's right thumb 402c while the handheld device 400 is held by the user's right hand. The example shown in FIG. 4C is similar to the example shown in FIG. 4B except that a different range of angles (between θmin(right) and θmax (right)) associated with operation of the device 400 by the right hand is used, and based on the angle (θfinger) corresponding to the orientation of the finger being within that range, the processing system of the device 400 generates a signal indicating that the device 400 is being operated using a right hand.

In the example depicted in FIG. 4C, it can be seen that θmin(right) is about 30 degrees to the right of the vertical axis 410 (+30°) and θmax(right) is about 150 degrees to the right of the vertical axis 410 (+150°), and that the range of angles includes the situation where the right thumb is horizontally placed on the fingerprint sensor from the right side of the mobile device (i.e., the thumb is placed along horizontal axis 420 on the right side of the device, or, in other words, at 90 degrees to the right of the vertical axis (+90°)).

It will be appreciated that, in other exemplary embodiments, other ranges of angles for θfinger may be associated with operation of the device 400 using the user's right hand. It is preferred that such ranges would include the θfinger of 90 degrees to the right of vertical (+90°), corresponding to a right thumb being placed horizontally on the fingerprint sensor from the right side of the mobile device.

It will also be appreciated that, in exemplary implementations other than the example depicted in FIGS. 4A-4C, a different frame of reference may be used. For example, the values of the angles may be determined relative to a horizontal axis rather than a vertical axis.

The angle (θfinger) corresponding to the orientation of the finger as shown in FIGS. 4B-4C may be determined by comparing fingerprint data obtained during the authorization operation with enrollment fingerprint data. For example, when determining whether a fingerprint on the fingerprint sensor 401 is a match with an enrolled fingerprint, the processing system associated with the fingerprint sensor 401 determines a difference in angle (dθ) between the fingerprint data obtained during authorization (e.g., the "verify template") and the enrollment fingerprint data (e.g., the "enrollment template"). In an exemplary implementation, this is performed by comparing features (such as thinned ridges, ridge flows, minutiae points, and the like) of the verify template with features of the enrollment template and determining a physical transformation that aligns the features of the verify template with features of the enrollment template. The physical transformation includes a rotation, which corresponds to an orientation of the finger that may be used to determine which hand is operating the device.

As can be seen in FIGS. 4B-4C, there may be one or more ranges of angles that fall outside of the first range for determining left-handed operation (shown in FIG. 4B) and the second range for determining right-handed operation (shown in FIG. 4C). When the orientation of the finger (corresponding to θfinger) falls outside of the two ranges for left-handed and right-handed operation, the device 400 may generate a signal indicating that no determination was made, or, in other words, that the device is operated using an undetermined hand (or an "indeterminate" signal). It is preferred that the range(s) of angles for which an indeterminate signal will be generated includes the angle(s) corresponding to a finger being placed vertically on the fingerprint sensor (e.g., along vertical axis 410).

In the case where the enrollment operation for the finger being authenticated was performed in a vertical manner (as illustrated in FIG. 4A), the angle between the finger during authentication and the finger during enrollment provides the orientation of the finger. In other cases, discussed in further detail below with respect to FIGS. 5A-5B, the enrollment data may have an enrollment angle that may further be considered during the determination of the orientation of the finger.

Figure 5A:
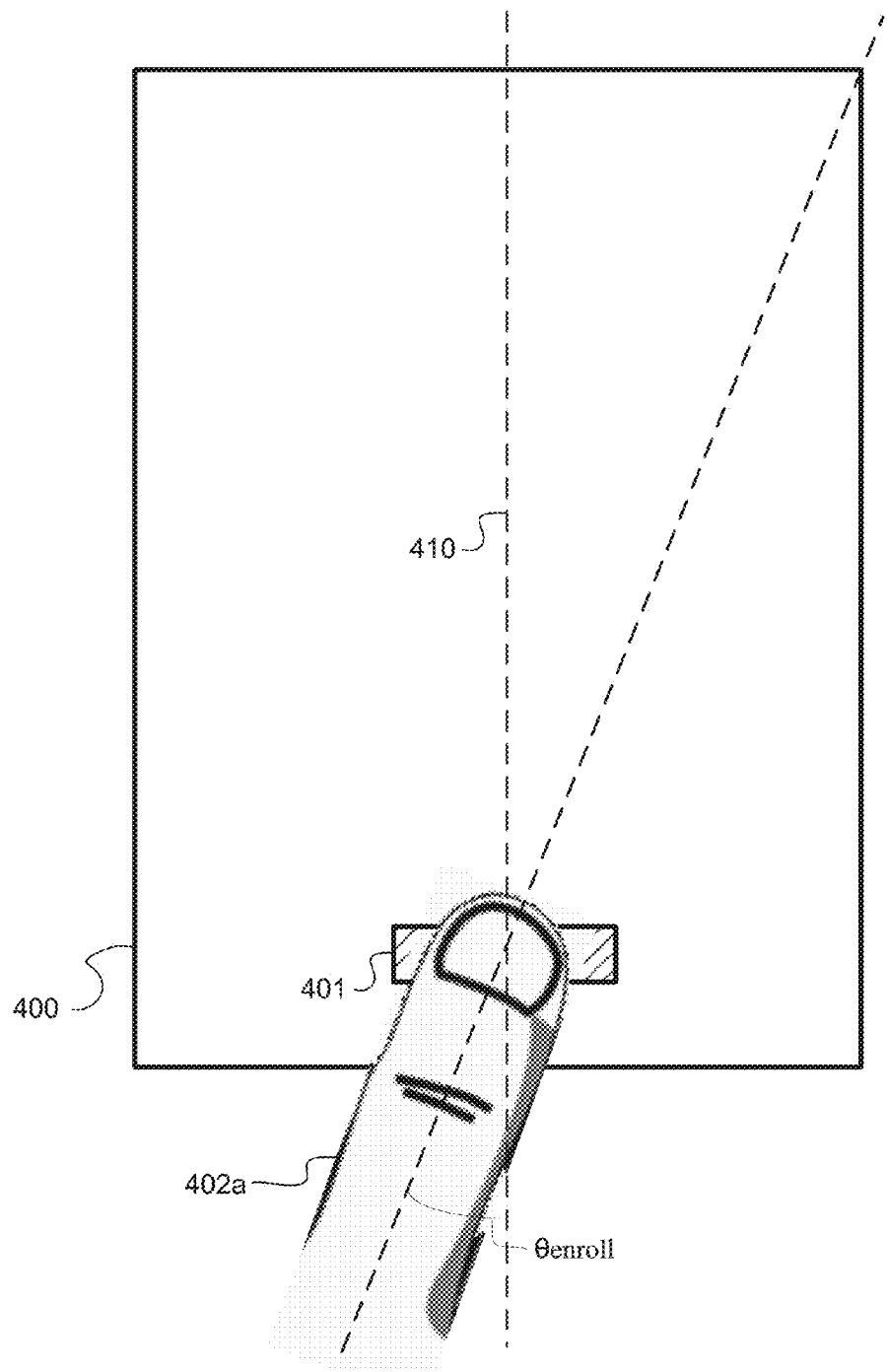
FIGS. 5A-5B illustrate additional exemplary use cases for a handheld device having a fingerprint sensor.
Figure 5B:
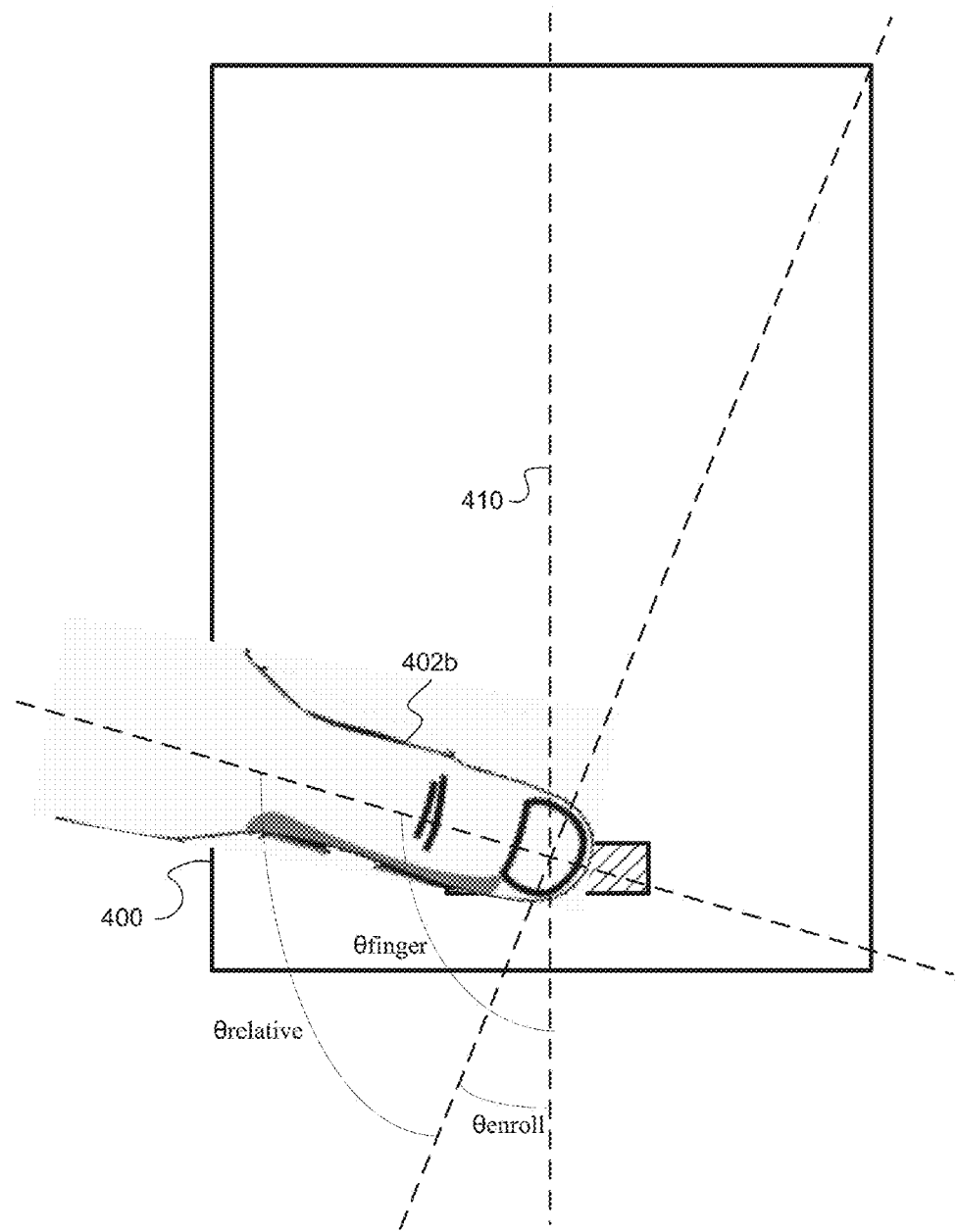

FIGS. 5A-5B illustrate additional exemplary use cases for a handheld device having a fingerprint sensor. FIG. 5A illustrates an exemplary enrollment operation, where a user is registering the thumb of either the user's right hand or left hand 402a with a fingerprint sensor 401 of the handheld device 400 in a non-vertical manner (i.e., such that a non-zero angle θenrollment between the thumb and the vertical axis 410 is present). FIG. 5B illustrates an exemplary authorization operation performed by the fingerprint sensor 401 with respect to the user's left thumb 402b while the handheld device 400 is held by the user's left hand.

FIG. 5B is similar to FIG. 4B in that the user's left thumb 402b is placed on the fingerprint sensor 401 at an angle (θfinger) relative to the vertical axis 410. However, since the user had performed enrollment with an enrollment angle θenrollment, comparing the orientation of the user's finger relative to the orientation of the user's finger yields a relative angle θrelative that is not the same as θfinger. The orientation of the finger, corresponding to the angle θfinger, is thus determined from a combination of the enrollment angle (θenrollment) and the relative angle between the fingerprint at enrollment and the fingerprint at authorization (θrelative). In one example, the θrelative depicted in FIG. 5B may be approximately −90° and is added to the θenrollment of approximately −30° to obtain a θfinger of approximately −120°.

The enrollment angle is thus estimated and the "verify" or authorization angle is evaluated against the estimated enrollment angle. To estimate the enrollment angle, the enrollment angle for each individual enroll image view be estimated, or, if the enrollment template is a composite from some or all of the enrollment views, the enrollment angle may be estimated from the angle of the composite view.

It will be appreciated that different polarities and frames of references may be used, which may further correspond to different mathematical operations, in other exemplary implementations.

Figure 6A:
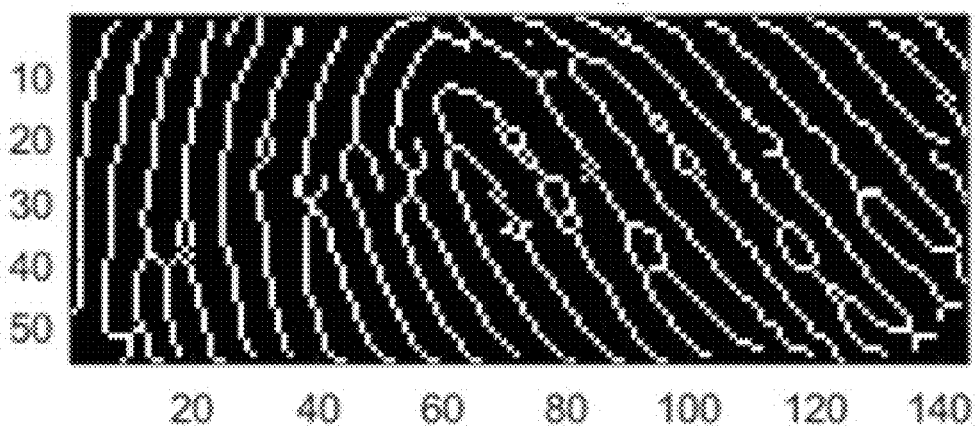
FIGS. 6A-6B are exemplary images of portions of a fingerprint on a user's thumb being placed onto a fingerprint sensor.
Figure 6B:
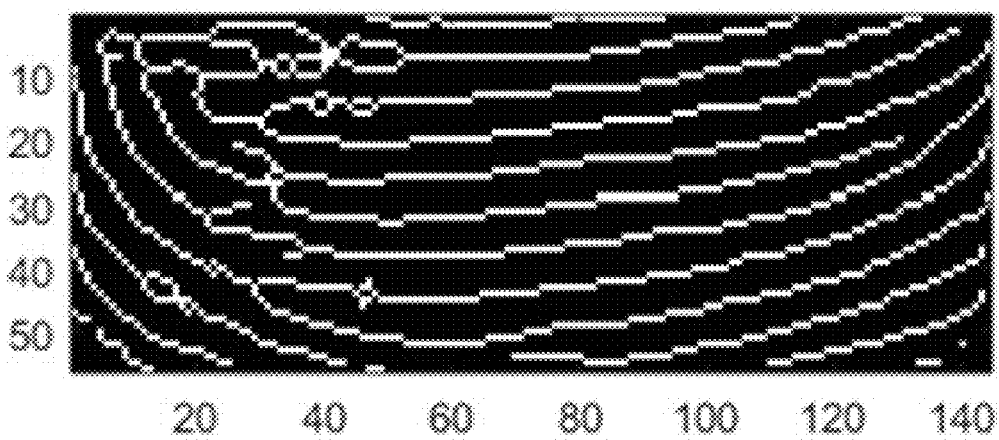

In another exemplary embodiment, an orientation of a finger placed on the fingerprint sensor may be determined from analysis of a local orientation field (having local orientation features) extracted from the fingerprint image (for example, by considering the local orientations of ridges and valleys in sensing data detected by the fingerprint sensor). FIG. 6A is an exemplary image of a portion of the fingerprint on a user's thumb placed substantially vertically onto a fingerprint sensor. FIG. 6B is an exemplary image of a portion of the fingerprint on a user's thumb placed substantially horizontally onto a fingerprint sensor. As can be seen in FIGS. 6A-6B, local orientation features of the fingerprint corresponding to the finger being placed vertically onto the fingerprint sensor are distributed and oriented differently from when the finger is placed horizontally onto the fingerprint sensor (e.g., the "swirl" of the fingerprint is recognizable in both FIGS. 6A-6B). A processing system can thus analyze the sensing data detected by the fingerprint sensor to determine the orientation of the finger without reference to an enrollment template.

In one example, the processing system acquires the image, performs feature extraction on the image to get a local orientation field (having the local orientation features), and then estimates the orientation of the finger from local orientation values corresponding to the local orientation features. The local orientation values are obtained by assigning an "orientation" value to each pixel or grouping of pixels, which defines the orientation of a local patch of ridge(s) and/or valley(s). That is, the orientation value gives a local value of the orientation of ridges at that point, and from the local orientation values, the overall orientation of the finger is determined (e.g., a determination of whether the finger is touching the sensor in a vertical manner or a horizontal manner and/or a determination of the angle corresponding to the orientation of the finger). Various approaches can be used to make the determination of the orientation of the finger, including, for example, neural network learning based on the local orientation and other features present in the image.

In yet another exemplary embodiment, sensing data detected by a touch sensor, such as the touch screens depicted in FIGS. 3A-3B, may be used together with sensing data from a fingerprint sensor to determine the orientation of a user's finger.

Figure 7B:
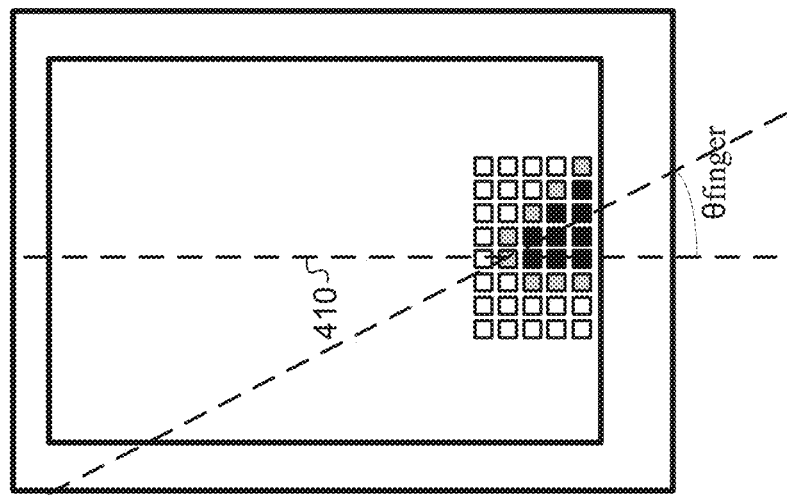
FIG. 7B illustrates a data map corresponding to exemplary sensing data obtained from the fingerprint sensor and the touch sensor of FIG. 7A.
Figure 7A:
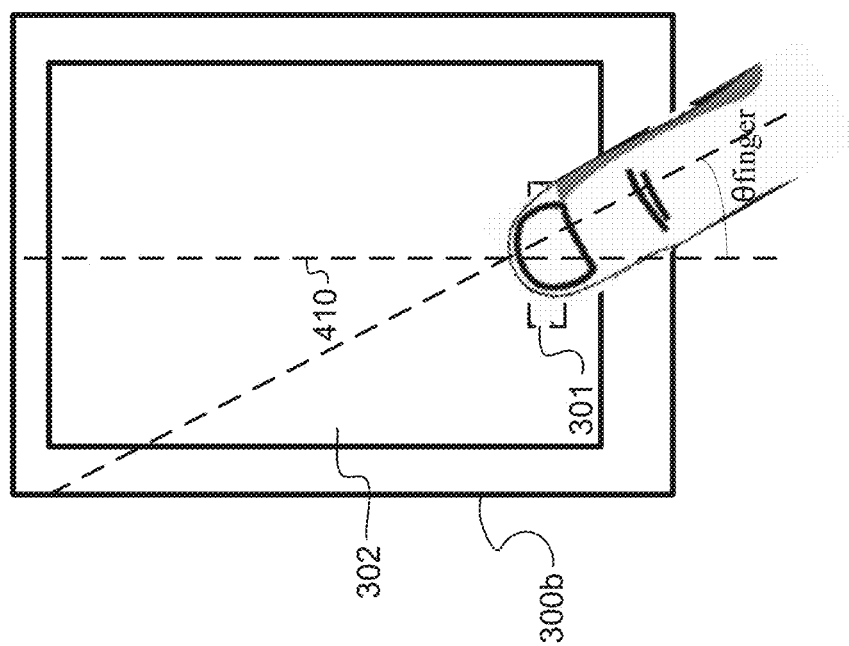
FIG. 7A illustrates an exemplary finger placed on a fingerprint sensor integrated with a touch screen.

FIG. 7A illustrates an exemplary finger placed on a fingerprint sensor integrated with a touch screen (e.g., during an authorization operation). As can be seen in FIG. 7A, the user's finger contacts portions of the fingerprint sensor 301 as well as the touch sensor of the touch screen 302. FIG. 7B illustrates a data map corresponding to exemplary sensing data obtained from the touch sensor (and/or the fingerprint sensor) of FIG. 7A. Each point in the data map indicates a value of one touch sensor pixel. Based on the shape formed by the data sensed by the touch sensor (and/or the fingerprint sensor), an orientation of the finger may be determined. In one exemplary embodiment, by analyzing the overall shape (such as evaluating the position of a centroid of the shape or considering other shape parameters such as the distribution of pixel amplitudes), a processing system determines whether a left hand or a right hand (or an indeterminate hand) is being used to operate the exemplary device 300b. For instance, the shape of the data map shown in FIG. 7B is one exemplary shape that may be considered by the processing system as corresponding to operation by a right hand.

In a further exemplary embodiment, an angle (θfinger) corresponding to the orientation of the finger is determined from the shape of the finger contacting the fingerprint sensor and the touch sensor, and the determination of whether a left hand or a right hand (or an indeterminate hand) is being used to operate the device is based on the determined angle. For example, if the angle falls within a first range, the processing system can determine that the device is being operated by a left hand, and if the angle falls within a second range, the processing system can determine that the device is being operated by a right hand. Additionally, additional range(s) of angles may correspond to the generation of an "indeterminate" signal.

Figure 8B:
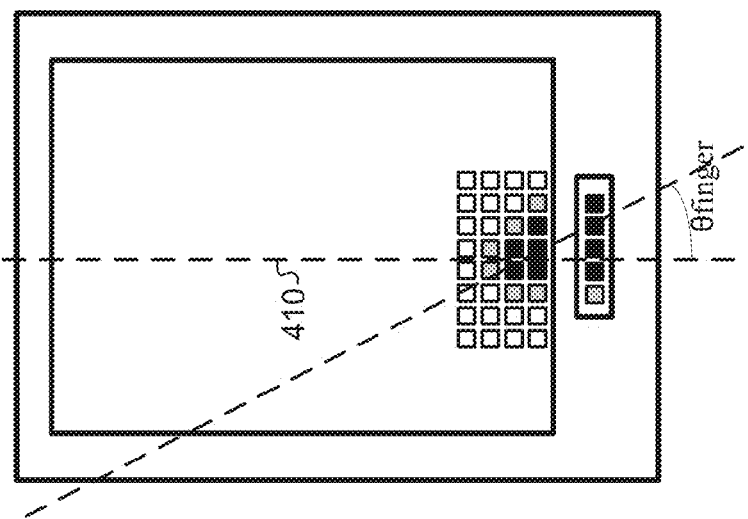
FIG. 8B illustrates a data map corresponding to exemplary sensing data obtained from the fingerprint sensor and the touch sensor of FIG. 8A.
Figure 8A:
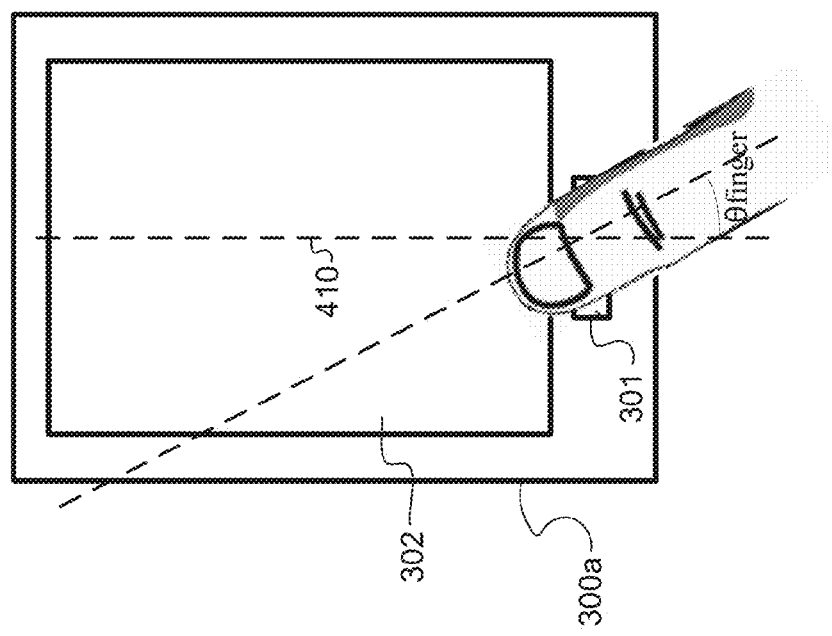
FIG. 8A illustrates an exemplary finger placed on a fingerprint sensor separate from a touch screen.

FIG. 8A illustrates an exemplary finger placed on a fingerprint sensor separate from a touch screen. As can be seen in FIG. 8A, the user's finger contacts portions of the fingerprint sensor 301 as well as the touch sensor of the touch screen 302. FIG. 8B illustrates a data map corresponding to exemplary sensing data obtained from the fingerprint sensor and the touch sensor of FIG. 8A. Similar to the discussion above with respect to FIGS. 7A-7B, the detected shape and/or a determined angle corresponding to the detected shape may be used to determine which hand is being used to operate the exemplary device 300a.

In one exemplary implementation, because the touch sensor and the fingerprint sensor are separate, a centroid (or other characteristic) corresponding to the shape of the finger (or, in other words, the "touch position" corresponding to the touch data obtained from the touch sensor) on the touch sensor may be compared with a centroid (or other characteristic) corresponding to the shape of the finger on the fingerprint sensor, and, for example, if the centroid on the touch sensor is offset from the centroid on the fingerprint sensor in one direction or the other direction, operation by a right hand or left hand may be determined based thereon.

In another exemplary implementation, the centroid (or other characteristic) corresponding to the shape of the finger on the touch sensor may be compared with the position or center of the fingerprint sensor (without relying on the sensing data from the fingerprint sensor except to determine that the touch sensor was contacted at the same time an authorization operation was performed). Thus, if the centroid (or other characteristic) corresponding to the shape of the finger on the touch sensor is offset from the center of the fingerprint sensor in one direction or the other direction, operation by a right hand or left hand may be determined based thereon.

In both the case where the fingerprint sensor overlaps with the touch sensor (FIGS. 7A-7B) and the case where the fingerprint sensor does not overlap with the touch sensor (FIGS. 8A-8B), a "touch position" associated with the touch sensor data may be based on touch sensor data (e.g., a single position [x, y]) that is compared to the center of the fingerprint sensor or a position associated with fingerprint sensor data. A relative angle or orientation of the finger may be determined based on the touch position relative to the fingerprint sensor or the fingerprint sensor data to determine which hand is being used to operate the device (or in the case of the angle or orientation not being sufficiently definitive, that the determination cannot be made). Alternatively, the processing system may evaluate whether the "touch position" is offset to the left or right of the center of the fingerprint sensor or the position associated with the fingerprint sensor data to determine which hand is being used to operate the device (or in the case of the offset in either direction being too small or non-existent, that the position of the finger is too vertical for the determination to be made).

Thus, touch sensor data showing that the touch position associated with the touch sensor data is sufficiently to the left relative to the center of the fingerprint sensor or relative to the position associated with the fingerprint sensor data (e.g., based on a determined angle or offset) indicates that the device is being operated or held by the left hand, while touch sensor data showing that the touch position associated with the touch sensor data is sufficiently to the right relative to the center of the fingerprint sensor or relative to the position associated with the fingerprint sensor data indicates that the device is being operated or held by the right hand.

In yet another exemplary embodiment, motion data detected by a fingerprint sensor and/or a touch sensor may be used to determine the orientation of a user's finger when the user provides a fingerprint for an authorization operation. FIG. 9A illustrates an exemplary swiping motion across a fingerprint sensor 301 on an exemplary device 300a using a finger from a left hand. FIG. 9B illustrates an exemplary swiping motion across a fingerprint sensor 301 on an exemplary device 300b using a finger from a right hand. For example, if a user attempts to swipe a left thumb across the fingerprint sensor while holding the device with a left hand, the direction of motion will be towards the left of vertical, as shown in FIG. 9A, since the thumb rotates from an anchor point on the left side of the device. Similarly, the direction of motion will be towards the opposite side for the right thumb, as shown in FIG. 9B. By determining the direction of motion, the processing system determines an orientation of the user's finger (e.g., θfinger as depicted in FIGS. 9A-9B), and based on that determined orientation, is able to determine whether the device is being operated with the left hand or the right hand and generate a corresponding indication signal (or an "indeterminate" signal).

In one exemplary implementation, determining the direction of motion includes correlating multiple sequential fingerprint images corresponding to the finger being swiped over the fingerprint sensor. In another exemplary implementation, the direction of motion is determined based on motion data obtained from the touch sensor while a fingerprint authorization operation is being performed by the fingerprint sensor. In another exemplary implementation, positional data from both the fingerprint sensor and the touch sensor are used to determine the direction of motion of the finger.

In an exemplary embodiment, an exemplary device uses one of the techniques described herein to determine whether a left hand or a right hand is holding the device. After the determination is made, the device further determines whether the user switches the hand that the user is holding the device with.

Figure 10:
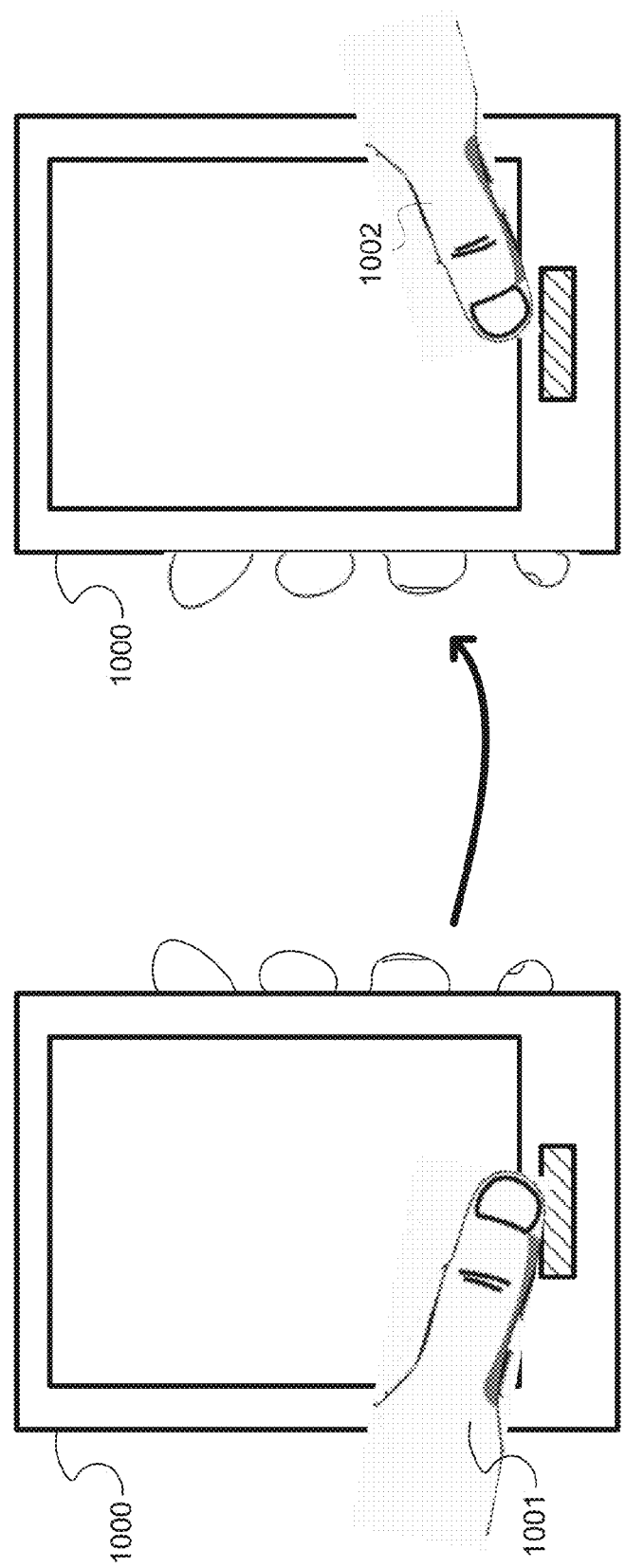
FIG. 10 illustrates an exemplary device having an accelerometer that is transferred from a user's left hand to the user's right hand.

FIG. 10 illustrates an exemplary device 1000 having an accelerometer that is transferred from a user's left hand 1001 to the user's right hand 1002. Based on data detected from the accelerometer indicating a movement pattern consistent with the user switching from the left hand to the right hand, a processing system of the device determines that the device 1000, which was previously being held by the user's left hand 1001, is now being held by the user's right hand 1002.

In an example, the accelerometer data may indicate a movement pattern corresponding to a lateral movement of the device 1000 and/or rotation(s) of the device 1000 consistent with the device 1000 being handed from a left hand to the right hand.

Once the determination is made that the device has changed hands, appropriate processing can be performed by the device's processing system, including, for example, adjusting the GUI of the device from a left-handed GUI to a right-handed GUI.

In a further exemplary embodiment, data from the accelerometer may also be used to determine that the user has put the device down, for example, by determining that the device is at rest (corresponding to a stable position without any movement) or by detecting a downward movement of the device followed by a period of lack of motion. Once the determination is made that the device has been put down, the hand-specific operational parameters can be reset, for example, by adjusting the GUI of the device from a left-handed GUI or right-handed GUI to a neutral GUI.

Figure 11:
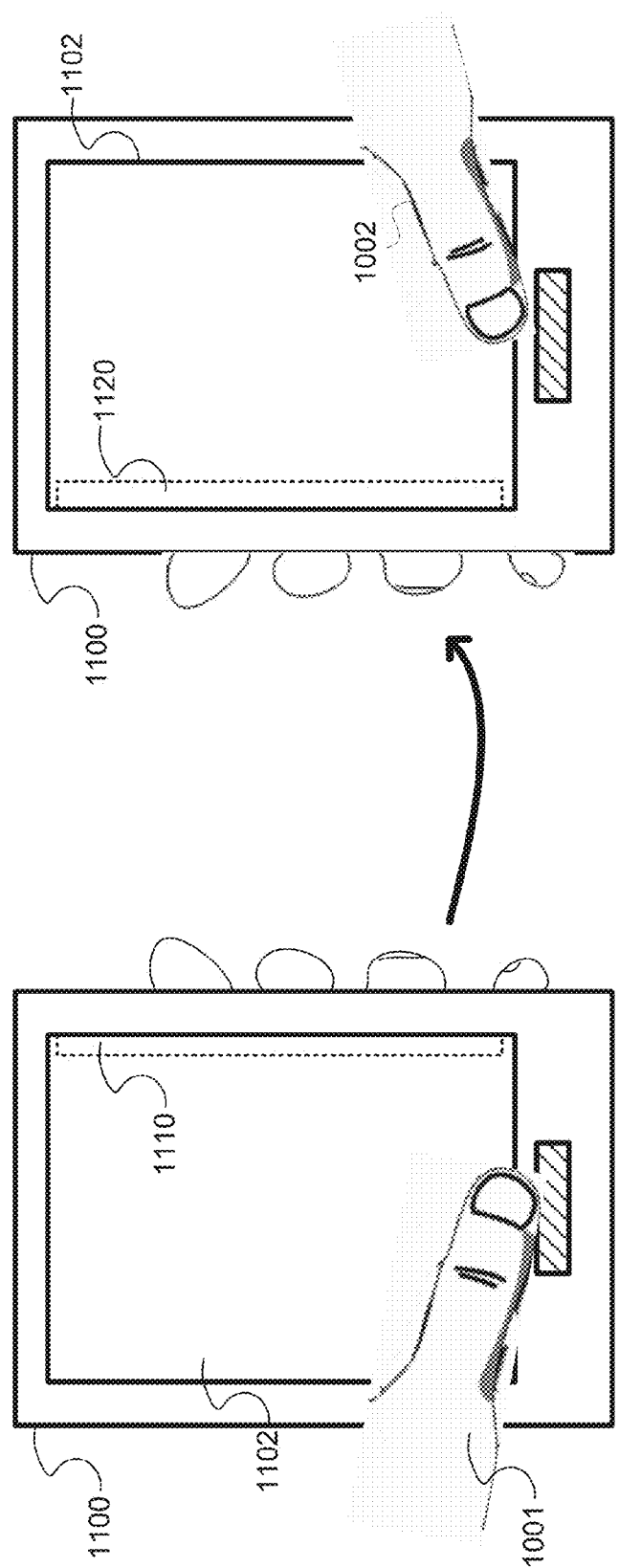
FIG. 11 illustrates an exemplary device having a touch screen that is transferred from a user's left hand to the user's right hand.

FIG. 11 illustrates an exemplary device 1100 having a touch screen 1102 with a touch sensor that is transferred from a user's left hand 1001 to the user's right hand 1002. When the device 1100 is held by the user's left hand, the user's index, middle, ring and/or pinky fingers may contact the right side 1110 of the touch screen 1102, indicating a manner of grip for the device 1100 consistent with the device 1100 being held by the left hand. Likewise, when the device 110 is held by the user's right hand, the user's index, middle, ring and/or pinky fingers may contact the left side 1120 of the touch screen 1102, indicating a manner of grip for the device 1100 consistent with the device 1100 being held by the right hand. Thus, based on data detected from the touch sensor of the touch screen 1102, the processing system is able to determine whether the user's grip on one or both sides of the mobile device has been released. Further, after the release, if a different grip is established that corresponds to the device being gripped by the user's other hand, the processing system may determine that the user has transferred the device from one hand to the other and respond appropriately (e.g., by adjusting the GUI of the device from a left-handed GUI to a right-handed GUI).

Alternatively, after the release, if the same or similar grip is established corresponding to the device being gripped by the same hand that was originally gripping the device, the processing system may determine that the device has not been transferred from one hand to the other and operate accordingly (e.g., by maintaining the GUI of the device in the previous left-handed configuration). In another alternative example, after the release, if no subsequent grip is detected, the processing system may determine that the device has been put down and respond appropriately (e.g., by changing the GUI of the device from a left-handed GUI to a neutral GUI).

In an alternative exemplary embodiments, the device may further include discrete side touch sensors, separate from the touch sensor of the touch screen and disposed on respective sides/edges of the device, or the device's touch sensor may extend beyond the edges of the screen to include side touch sensor portions along the respective sides/edges of the devices. Such side touch sensor or side touch sensor portions may similarly be used to determine the manner in which a user is gripping the device.

The foregoing exemplary embodiments include techniques for determining which hand is being used to operate and/or hold a device using a fingerprint sensor, including, for example, determination of an orientation of a finger based on comparisons of authorization data with enrollment data, analysis of local orientations of fingerprint features, considering touch sensor data in combination with fingerprint data (e.g., by determining a shape of the finger placed onto the touch and/or fingerprint sensor), a determined direction of motion corresponding to an authorization operation, analysis of accelerometer data and/or side touch sensor data, etc. In a further exemplary embodiment, a confidence value may be calculated by the processing system using these techniques or a combination of multiple techniques. For example, if the orientation of a finger is detected as being closer to a horizontal placement/motion, a stronger confidence value may be associated with the determination of which hand is used to operate and/or hold the device. In another example, determinations of which hand is used to operate and/or hold the device are performed via multiple techniques to check for consistency (i.e., to make sure both techniques indicate the same hand) or to provide a higher confidence value associated with the determination.

Figure 12:
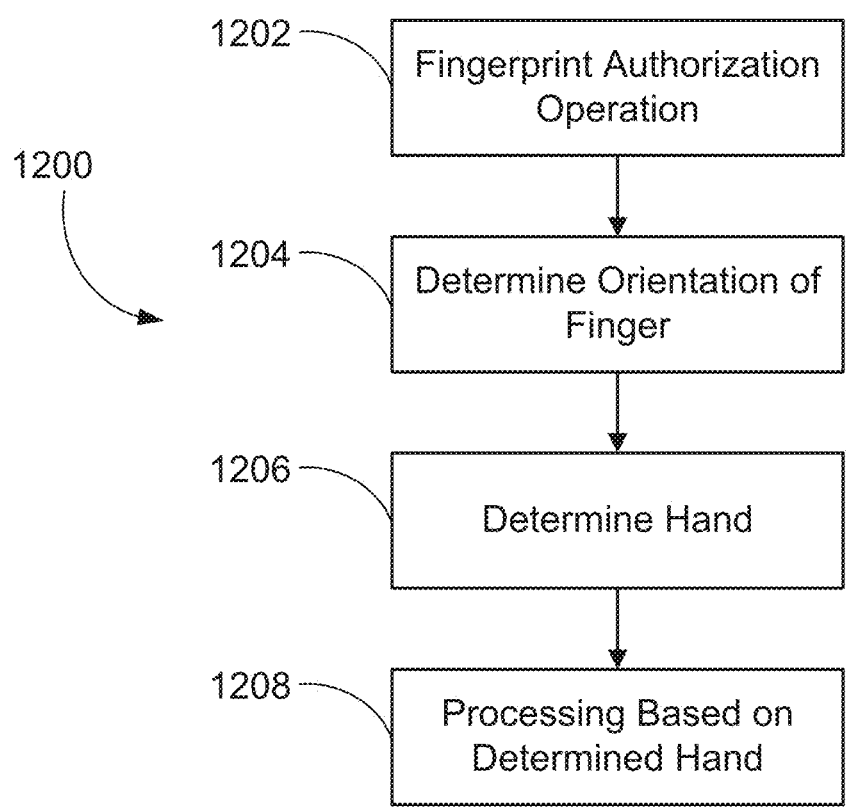
FIG. 12 is a flowchart illustrating an exemplary method for determining which hand is being used to operate a device.

FIG. 12 is a flowchart 1200 illustrating an exemplary method for determining which hand is being used to operate a device. At stage 1202, a user performs an authorization operation with respect to the device by placing or swiping his or her finger on or across a fingerprint sensor of the device. Based on sensing data detected by the fingerprint sensor (and in some embodiments, further based on sensing data detected by a touch sensor of the device), a processing system of the device determines an orientation of the finger corresponding to the authorization operation at stage 1204. Using the determined orientation, the processing system determines which hand (left or right or indeterminate) is being used to operate the device at stage 1206. Further processing is then performed by the device at stage 1208 based on the determined hand.

In an exemplary embodiment, the device modifies the graphical user interface (GUI) displayed on a touch screen of the device to provide a more convenient and better experience for the user based on the determined hand. If it is determined that the left hand is being used to hold the device, the GUI is modified such that buttons or other input elements (such as icons or a keyboard) are shifted, relative to a default neutral-handed GUI, to position(s) that are easier for a person's left thumb to interact with those elements (e.g., by orienting such interactive elements farther to the left side of the screen). Non-interactive content displayed by the screen may also be shifted, for example, to the right, to avoid potentially being obstructed from the user's view based on the expected position of the user's left thumb while holding the device with the left hand. Conversely, if it is determined that the right hand is being used to hold the device, interactive elements as well as non-interactive elements of the GUI may be shifted, relative to a default neutral-handed GUI, to position(s) more suitable for a user holding the device with the right hand and interacting with the device with the right thumb.

In further exemplary embodiments, different degrees of adjustments may be made to the GUI based on the determined orientation of the finger at stage 1204. For example, if the finger is detected as being horizontal or lower than horizontal, this might indicate that the user is gripping the device with the left or right hand at a lower position on the device than if the finger is detected as being above horizontal. If the grip is low, it may be desirable to position the interactive elements of the GUI closer to the edge of the device so that it is easier for the user to reach them. If the grip is high, it may be desirable to position the interactive elements of the GUI farther from the edge of the device so that it is more comfortable for the user to reach them (e.g., instead of having to bend the thumb back to reach an interactive element close to the edge, the user can just press down). Different degrees adjustment to the GUI may also be made based on a determined confidence value associated with the hand determination (e.g., by adjusting the GUI to a smaller degree in case of low confidence and making larger adjustments with high confidence).

In another exemplary embodiment, the processing based on the determined hand at stage 1208 includes collecting data regarding which hand the user prefers to operate or hold the device with, e.g., by carrying out stages 1202, 1204 and 1206 multiple times and aggregating the results of multiple hand determinations from stage 1206. The collected data may then be used to determine which hand is the user's "dominant" or "preferred" hand with respect to operation of the device. The collected data may utilized by the processing system of the device and/or communicated to a server or other devices (e.g., to provide additional information regarding the user's preferences for other entities such as device/component manufacturers, network operators and advertisers, or to provide the preference information to other devices for application of the user's preferences in those devices).

It will be appreciated that the embodiments of the disclosure discussed herein are particularly advantageous for single-handed operation of a mobile device (e.g., holding a smartphone or tablet with one hand and using the thumb on that hand to perform a fingerprint authorization). However, there may also be situations where a user holding a device with one hand and performing input operations with the other hand (or situations where a device is resting on a surface or in a holder) where the principles of the above-described embodiments may also be applied. For example, if a user is holding a mobile device with his or her left hand and places his or her right thumb on a fingerprint sensor at an angle indicative of operation by the user's right hand, it may be advantageous for the mobile device to perform processing consistent with operation using a right hand (even though the mobile device is held using the left hand).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for using a fingerprint sensor of a mobile device to determine which hand is being used to operate the mobile device, comprising:
   acquiring, by a processor, sensing data from the fingerprint sensor corresponding to a finger sensed by the fingerprint sensor;
   acquiring touch data from a touch sensor of the mobile device corresponding to the finger;
   determining, by the processor, an orientation of the finger based on the acquired sensing data from the fingerprint sensor and the acquired touch data from the touch sensor; and
   generating, by the processor, a signal for indicating which hand is being used to operate the mobile device based on the determined orientation of the finger.

2. The method according to claim 1, wherein determining the orientation of the finger further comprises:
   comparing the acquired sensing data to enrollment data and determining a relative angle between the acquired sensing data and the enrollment data.

3. The method according to claim 2, wherein the determined orientation of the finger is based on the determined relative angle in combination with an enrollment angle corresponding to the enrollment data.

4. The method according to claim 2, wherein comparing the acquired sensing data to the enrollment data comprises comparing features of a sensed fingerprint image with features of an enrollment fingerprint image.

5. The method according to claim 1, wherein the determined orientation of the finger is based on a local orientation field corresponding to ridges and/or valleys of the sensing data.

6. The method according to claim 1, wherein a first range of angles for the determined orientation of the finger corresponds to generating a signal indicating that the mobile device is being operated using a left hand, and a second range of angles for the determined orientation of the finger corresponds to generating a signal indicating that the mobile device is being operated using a right hand.

7. The method according to claim 6, wherein the first range of angles is a set of angles corresponding to a finger being placed off of a vertical axis on the fingerprint sensor from one side of the mobile device, and wherein the second range of angles is a set of angles corresponding to a finger being placed off of a vertical axis on the fingerprint sensor from an opposite side of the mobile device.

8. The method according to claim 7, wherein the first range of angles includes an angle corresponding to a finger being placed horizontally on the fingerprint sensor from the one side of the mobile device, and wherein the second range of angles includes an angle corresponding to a finger being placed horizontally on the fingerprint sensor from the opposite side of the mobile device.

9. The method according to claim 7, wherein a third range of angles for the determined orientation of the finger corresponds to generating a signal indicating that the mobile device being operated using an undetermined hand, wherein the third range of angles includes an angle corresponding to a finger being placed vertically on the fingerprint sensor.

10. The method according to claim 1, wherein determining the orientation of the finger further comprises:
    determining a shape parameter based on a detected shape from the acquired touch data;
    wherein the determined orientation of the finger is based on an angle corresponding to the determined shape parameter.

11. The method according to claim 1, wherein the determined orientation of the finger includes a direction of motion of the finger;
    wherein a first direction of motion towards one side of the mobile device corresponds to generating a signal indicating that the mobile device is being operated using a left hand, and a second direction of motion towards an opposite side of the mobile device corresponds to generating a signal indicating that the mobile device is being operated using a right hand.

12. The method according to claim 11, wherein determining the direction of motion of the finger comprises:
    correlating multiple sequential fingerprint images corresponding to the finger being swiped over the fingerprint sensor.

13. The method according to claim 1, further comprising:
    determining, by the processor, whether the mobile device has changed hands based on data from another sensor of the mobile device.

14. The method according to claim 13, wherein the another sensor of the mobile device is an accelerometer, and determining whether the mobile device has changed hands is based on data from the accelerometer indicating a movement pattern.

15. The method according to claim 13, wherein the another sensor of the mobile device is the touch sensor, and determining that the mobile device has changed hands includes:
    determining, based on data from the touch sensor, a release in grip on the side of the mobile device, and, after the release in grip, an establishment of a different grip.

16. The method according to claim 1, further comprising:
    modifying, by the mobile device, based on the generated signal, a graphical user interface (GUI) displayed by the mobile device.

17. A system for using a fingerprint sensor of a mobile device to determine which hand is being used to operate the mobile device, the system comprising:
    the fingerprint sensor, configured to generate sensing data corresponding to a finger sensed by the fingerprint sensor;
    a touch sensor, configured to generate touch data corresponding to the finger; and
    a processing system, configured to acquire the sensing data from the fingerprint sensor, acquire the touch data from the touch sensor, determine an orientation of the finger based on the acquired sensing data and the acquired touch data and generate a signal for indicating which hand is being used to operate the mobile device based on the determined orientation of the finger.

18. The system according to claim 17, wherein determining the orientation of the finger further comprises:
comparing the sensing data to enrollment data and determining a relative angle between the sensing data and the enrollment data.

19. The system according to claim 17, wherein a first range of angles for the determined orientation of the finger corresponds to generating a signal indicating that the mobile device is being operated using a left hand, and a second range of angles for the determined orientation of the finger corresponds to generating a signal indicating that the mobile device is being operated using a right hand; and
wherein the first range of angles is a set of angles corresponding to a finger being placed off of a vertical axis on the fingerprint sensor from one side of the mobile device, and wherein the second range of angles is a set of angles corresponding to a finger being placed off of a vertical axis on the fingerprint sensor from an opposite side of the mobile device.

20. A mobile device, comprising:
a fingerprint sensor, configured to generate sensing data corresponding to a finger sensed by the fingerprint sensor;
a touch screen display, configured to display a graphical user interface (GUI) and generate touch data corresponding to the finger; and
a processing system, configured to acquire the sensing data from the fingerprint sensor, acquire the touch data from the touch screen display, determine an orientation of the finger based on the acquired sensing data and the acquired touch data, generate a signal for indicating which hand is being used to operate the mobile device based on the determined orientation of the finger, and modify the GUI based on the generated signal.

21. The mobile device according to claim 20, wherein modifying the GUI further comprises:
orienting one or more interactive components of the GUI towards one side or another side of the touch screen display based on whether the mobile device is being operated using a left hand or a right hand, respectively.

* * * * *